(12) United States Patent
Lovtjärn et al.

(10) Patent No.: US 10,185,394 B2
(45) Date of Patent: Jan. 22, 2019

(54) GAZE DIRECTION MAPPING

(71) Applicant: Tobii AB, Danderyd (SE)

(72) Inventors: André Lovtjärn, Danderyd (SE);
 Jesper Högström, Danderyd (SE);
 Jonas Högström, Danderyd (SE);
 Rasmus Petersson, Danderyd (SE);
 Mårten Skogö, Danderyd (SE); Wilkey Wong, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 15/837,155

(22) Filed: Dec. 11, 2017

(65) Prior Publication Data

US 2018/0101228 A1 Apr. 12, 2018

Related U.S. Application Data

(63) Continuation of application No. 15/692,714, filed on Aug. 31, 2017, now Pat. No. 9,870,051, which is a
(Continued)

(51) Int. Cl.
 G06F 3/01 (2006.01)
 G02B 27/01 (2006.01)
 (Continued)

(52) U.S. Cl.
 CPC .......... G06F 3/013 (2013.01); G02B 27/017 (2013.01); G06F 3/005 (2013.01); G06F 3/017 (2013.01);
 (Continued)

(58) Field of Classification Search
 CPC .......... G02B 2027/0138; G02B 27/017; G02B 2027/0178; G02B 2027/018;
 (Continued)

(56) References Cited

U.S. PATENT DOCUMENTS 8,558,759 B1 10/2013 Prada Gomez et al.
9,829,976 B2 11/2017 Algotsson et al.
(Continued)

FOREIGN PATENT DOCUMENTS

WO 2017/027532 A1 2/2017

OTHER PUBLICATIONS

U.S. Appl. No. 14/954,026, "Non-Final Office Action", dated Apr. 7, 2017, 15 pages.
(Continued)

Primary Examiner — Dmitriy Bolotin
(74) Attorney, Agent, or Firm — Kilpatrick Townsend & Stockton LLP

(57) ABSTRACT

A method for determining correspondence between a gaze direction and an environment around a wearable device is disclosed. The wearable device may include an eye tracking device and an outward facing image sensor. The method may include receiving an input parameter and at least one scene image from the outward facing image sensor. The method may further include determining, with at least the eye tracking device, at least one gaze direction of a wearer of the wearable device at a point in time corresponding to when the scene image was captured by the outward facing image sensor. The method may additionally include determining, based at least in part on the input parameter, that a particular scene image includes at least a portion of a predefined image. The method may moreover include determining, based on the at least one gaze direction, at least one gaze point on the particular scene image.

20 Claims, 7 Drawing Sheets

Related U.S. Application Data continuation-in-part of application No. 14/954,026, filed on Nov. 30, 2015, now Pat. No. 9,829,976.

(60) Provisional application No. 62/202,582, filed on Aug. 7, 2015.

(51) Int. Cl.
*G06F 17/30* (2006.01)
*G06F 3/00* (2006.01)
*G06F 3/0481* (2013.01)

(52) U.S. Cl.
CPC .... *G06F 3/04815* (2013.01); *G06F 17/30047* (2013.01); *G02B 2027/014* (2013.01); *G02B 2027/0138* (2013.01); *G02B 2027/0178* (2013.01); *G02B 2027/0187* (2013.01)

(58) Field of Classification Search
CPC .... G06F 17/30047; G06F 3/005; G06F 3/013; G06F 3/017; G06F 3/04815
See application file for complete search history.

(56) References Cited

U.S. PATENT DOCUMENTS

| | | | |
|---|---|---|---|
| 9,870,051 B2 | 1/2018 | Lovtjarn et al. | |
| 2012/0290401 A1 | 11/2012 | Neven | |
| 2013/0050258 A1 | 2/2013 | Liu et al. | |
| 2013/0083064 A1 | 4/2013 | Geisner et al. | |
| 2013/0154918 A1 | 6/2013 | Vaught et al. | |
| 2014/0003738 A1 | 1/2014 | Williams et al. | |
| 2014/0118225 A1 | 5/2014 | Jerauld | |
| 2014/0361971 A1 | 12/2014 | Sala | |
| 2014/0361996 A1 | 12/2014 | Eden et al. | |
| 2015/0016714 A1 | 1/2015 | Chui | |
| 2015/0049113 A1 | 2/2015 | Rahman et al. | |
| 2015/0061995 A1 | 3/2015 | Gustafsson et al. | |
| 2015/0092983 A1 | 4/2015 | Nguyen et al. | |
| 2016/0077337 A1 | 3/2016 | Raffle et al. | |
| 2017/0024604 A1* | 1/2017 | Cho | G06K 9/0061 |
| 2017/0038835 A1 | 2/2017 | Algotsson et al. | |
| 2017/0364150 A1 | 12/2017 | Lovtjärn et al. | |
| 2018/0088668 A1 | 3/2018 | Algotsson et al. | |

OTHER PUBLICATIONS

U.S. Appl. No. 15/809,138, "Non-Final Office Action", dated Mar. 22, 2018, 13 pages.

Munn et al., "3D point of regard, position and head orientation from a portable monocular video based eye tracker", ETRA '08 Proceedings of the 2008 symposium on Eye tracking research & applications, Mar. 26-28, 2008, pp. 181-188.

Paletta et al., "An integrated system for 3D gaze recovery and semantic analysis of human attention", Computer Vision and Pattern Recognition, Jul. 30, 2013, 4 pages.

PCT/US2016/045717, "International Preliminary Report on Patentability", dated Feb. 22, 2018, 13 pages.

PCT/US2016/045717, "International Search Report and Written Opinion", dated Jan. 13, 2017, 18 pages.

PCT/US2016/045717, "Invitation to Pay Additional Fees and Partial Search Report", dated Nov. 21, 2016, 6 pages.

* cited by examiner

US 10,185,394 B2

GAZE DIRECTION MAPPING

CROSS-REFERENCE TO RELATED APPLICATIONS

This application is a continuation of U.S. patent application Ser. No. 15/692,714, filed Aug. 31, 2017, and entitled: "GAZE DIRECTION MAPPING", which is a continuation-in-part of U.S. patent application Ser. No. 14/954,026, filed Nov. 30, 2015, and entitled "GAZE DIRECTION MAPPING," which claims priority to Provisional U.S. Patent Application No. 62/202,582, filed Aug. 7, 2015, and entitled "GAZE DIRECTION MAPPING," the entire disclosures of which are hereby incorporated by reference, for all purposes, as if fully set forth herein.

BACKGROUND OF THE INVENTION

Embodiments of the present invention generally relates to systems and methods for mapping gaze direction of at least one person to the environment around the person, and in particular, to systems and methods using a computer vision approach combined with a wearable device using at least information from a scene camera linked with the wearable device.

BRIEF DESCRIPTION OF THE INVENTION

In one embodiment, a method for determining a correspondence between a gaze direction and an environment around a wearable device is provided. The wearable device may include an eye tracking device and an outward facing image sensor. The method may include receiving an input parameter. The method may also include receiving at least one scene image from the outward facing image sensor. The method may further include determining, with at least the eye tracking device, at least one gaze direction of a wearer of the wearable device at a point in time corresponding to when the scene image was captured by the outward facing image sensor. The method may additionally include determining, based at least in part on the input parameter, that a particular scene image includes at least a portion of a predefined image. The method may moreover include determining, based on the at least one gaze direction, at least one gaze point on the particular scene image.

In another embodiment, a different method of determining a correspondence between a gaze direction and an environment around a wearable device is provided. The wearable device may include an eye tracking device and an outward facing image sensor. The method may include receiving at least one scene image from the outward facing image sensor. The method may also include determining, with at least the eye tracking device, at least one gaze direction of a wearer of the wearable device at a point in time corresponding to when the scene image was captured by the outward facing image sensor. The method may further include determining, based at least on an input parameter, that a particular scene image includes at least a portion of a predefined image. The method may additionally include determining, based on the at least one gaze direction, at least one gaze point on the particular scene image. The method may moreover include causing the scene image to be displayed with an overlaid visual indication, where the overlaid visual indication corresponds to at least a portion of the predefined image. The method may furthermore include receiving user feedback regarding adjustment of the overlaid visual indication. The method may also include adjusting the input parameter based at least in part on the user feedback. The method may further include determining, based on the input parameter as adjusted, that a future scene image includes at least a portion of the predefined image.

In another embodiment, a method for determining a correspondence between a gaze direction and an environment around a wearable device is provided. The wearable device may include an eye tracking device and an outward facing image sensor. The method may include receiving at least one scene image from the outward facing image sensor. The method may also include determining, with at least the eye tracking device, at least one gaze direction of a wearer of the wearable device at a point in time corresponding to when the scene image was captured by the outward facing image sensor. The method may further include determining, based at least in part on an input parameter, that a particular scene image includes at least a portion of a predefined image. The method may additionally include determining, based on the at least one gaze direction, at least one gaze point on the particular scene image. The method may moreover include determining a confidence value which is a representation of how probable it is that the at least one gaze point relates to the mapped point in the predefined image.

In another embodiment, a method for determining a correspondence between a gaze direction and an environment around a wearable device is provided. The wearable device may include an eye tracking device and an outward facing image sensor. The method may include receiving at least one scene image from the outward facing image sensor. The method may also include determining, with at least the eye tracking device, at least one gaze direction of a wearer of the wearable device at a point in time corresponding to when the scene image was captured by the outward facing image sensor. The method may further include determining, based at least in part on an input parameter, that a particular scene image includes at least a portion of a predefined image. The method may additionally include determining, based on the at least one gaze direction, at least one gaze point on the particular scene image. The method may moreover include determining a quality value which is a representation of a degree of error in the determined at least one gaze point on the particular scene image.

BRIEF DESCRIPTION OF THE DRAWINGS

The present invention is described in conjunction with the appended figures.

DETAILED DESCRIPTION OF THE INVENTION

Figure 1:
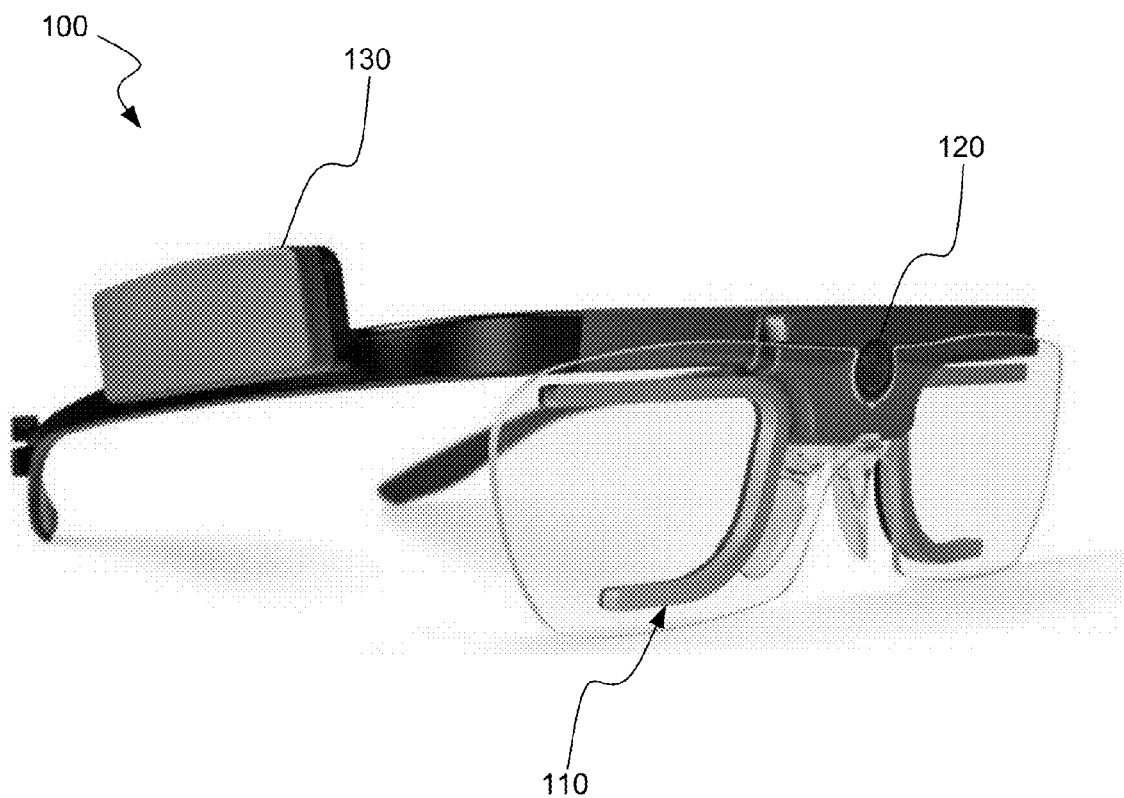
FIG. 1 is an axonometric view of an wearable device having an eye tracking device and a scene camera for use in various embodiments of the invention.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Wearable devices are devices capable of being worn by a user, typically they take the form of a pair of glasses, helmet, and/or the like. These glasses may incorporate various forms of sensors, displays, and/or electronics. For example a wearable device may contain an image sensor for capturing images or video of a scene around a wearer.

The wearable device may also contain an eye tracking device. For example, Tobii AB of Danderyd, Stockholm, Sweden offers for sale such a wearable device called "Tobii Pro Glasses 2". This device includes a scene camera in combination with an eye tracking device. It is therefore possible to combine images captured by the scene camera with information from the eye tracking device, to determine where in a particular scene a user is looking.

It is further possible to incorporate into the wearable device a positional device such as a microelectromechanical system (MEMS), which may include a gyroscope, an accelerometer, and/or the like. Such a system is disclosed in U.S. Patent Application Publication No. 2015/0061995, published Mar. 5, 2015, and entitled "PORTABLE EYE TRACKING DEVICE," the entire disclosure of which is hereby incorporated by reference, for all purposes, as if fully set forth herein.

What is required however is a method or system for determining, where a user has gazed in the environment about the user, and whether a user has gazed at certain items which may be consistently or inconsistently found at different places in the environment, without the need for a large amount of manual processing. It is a further advantage if such a system can determine the location of a user and map the environment around that user. Embodiments of the present invention seeks to provide such methods and systems.

According to one embodiment of the present invention, there is provided a method for mapping an environment using information from a wearable device. The information from the wearable device is typically obtained from an image sensor. In one embodiment, the image sensor faces outward from the wearable device, while the wearable device is also equipped with an eye tracking apparatus. The eye tracking apparatus may comprise at least one image sensor and at least one infrared illuminator, the image sensor and illuminator facing at least one eye of a wearer. In practice the infrared illuminator emits infrared light onto the cornea of a user, and the image sensor captures an image including the reflection of the infrared light. A controller may then analyze this captured image to determine a gaze direction of a user. Other methods of eye tracking may also be employed.

One such wearable device is shown in FIG. 1. Wearable device 100 is constructed of an eyeglass frame which includes eye tracking device 110, image sensor 120 (also referred to herein as a "scene camera"), and control unit 130. Eye tracking device 110 and image sensor 120 may relay information derived therefrom to control unit 130 for processing and/or wireless or wired communication back to another computing/processing device/system (not shown). Power for eye tracking device 110 and image sensor 120 may also be provided via control unit 130.

Using the above hardware or the like, one method according to the invention may be characterized by the following steps:

1. Obtain a scene image, images, or video from an outward facing image sensor on a wearable device.

2. Capture a gaze direction of the wearer of the wearable device, at a point in time corresponding to when the scene image, images, or video in step 1 was obtained.

3. Search the scene image, images, or video from step 1 to look for the presence of a predefined image based on the input parameter (i.e., the input parameter is a user instruction identifying the object of interest sought in the scene images) Thus, the input parameter could be information which specifies a visual representation of the object of interest (including the size and shape thereof). The predefined image could also be comprised of a textual message (a string of text), potentially in any font or format.

4. For each occurrence of the predefined image found in step 3, map the gaze directions from step 2 as gaze points on the particular scene image, images, or video having the occurrence of the predefined image.

5. Determine a confidence value for each gaze point mapped in step 4. The confidence value may represent how probable it is that the mapped gaze point relates to the predefined image. The confidence value may also include a message such as "occluded," "poor lighting," etc. which provides an indication as to gaze direction detection characteristics associated with the mapped gaze point.

As a precursor to the above steps, certain inputs or parameters may be defined to enhance the accuracy of the steps. These inputs and parameters are hereafter referred to as "input parameters" and will be described in further detail below. In some embodiments, these inputs are provided by a user, but they may also be provided automatically.

Optionally, a quality measure for determining the quality of eye tracking data may be determined based on any possible error sources. These error sources may, for instance, include an eye tracker, user input and errors related to the timing between the scene camera and the eye tracker data, etc. The latter could be exemplified in the following way: If the eye tracking data is captured at 50 Hz, and the outward facing sensor at 25 Hz, fast head motions will create ambiguities in what part of the scene that the user was actually looking at. These situations could be recognized by recording a lowered quality score of the mapping (also referred to herein as a quality value or measure).

In situations where mapped points have received high confidence scores but a low quality scores, the mapped gaze points should not be interpreted as singular points, but rather as larger "gaze areas" where it is likely that the user gazed. In contrast, when the confidence score is low, but the quality score is high, the user should inspect the points manually and correct them if needed since the mapping may be inaccurate.

Consider the above method in the context of one possible example of its intended use. A user enters a supermarket wearing a wearable device. The wearable device is equipped with both an outward facing scene camera and a gaze direction tracking device. The outward facing scene camera records scene video of the scene in front of the user, the gaze direction tracking device records the user's gaze relative to that scene. This scene video and gaze information is transmitted to a processing device. The processing device has been loaded with a predefined image, for example a cereal box, or a specific shelf containing many products. The processing device then analyses the incoming scene video and optionally, gaze information, to look for the presence of the predefined image. When the predefined image is found, the gaze direction relative to that predefined image is stored (which can be represented by a gaze point on the scene video, or within a specific image frame of the video). For each individual gaze direction, a value is assigned representing the confidence level in the accuracy of that gaze direction. Quality information may also be stored for individual gaze directions.

Transmission to, and analysis by, the processing device may be performed in real time or it may be performed on pre-recorded scene video and gaze information.

Embodiments of the present invention will now be described in further detail.

Input Parameters

The provision of input parameter allows the method of the present invention to function in a more efficient manner. The following is a description of possible input parameter.

Manually mapped points. An image point (possibly the position of a gaze point provided by the eye tracker) that has been manually identified by a user or separate algorithm as pertaining, or mapped to, an occurrence in a predefined image. The image point may be related to any item within the image, images or video captured by the outward facing image sensor. The point is thereby defined both in the predefined image and a video image from the outward facing camera.

Manually mapped area of interest points. Within the image, images or video captured by the outward facing image sensor an area of interest may be identified. This may be an occurrence of the predefined image, or it may be another item of interest within the image, images or video. An example of an appropriate method to provide this input parameter is allowing a user to drag a transparent and/or transformed version of at least a portion of the predefined image over the image, images or video. The user may alter the shape of this version of the predefined image by dragging the boundary points with a mouse or other pointing device, such that the user can match this version of the predefined image with an occurrence of the predefined image in the image, images or video. This allows the user to provide to the method of the present invention an input distinctly showing an example of the mapping of a predefined image to an occurrence of the predefined image in the image, images or video.

Predefined image presence. A user may manually indicate the presence of a predefined image in one or more images or videos from the outward facing image sensor. The present method can then be performed in more detail on those images or videos, in particular steps 3-5 may be performed multiple times, or at a slower speed, on the images or videos marked as there is a high likelihood that an occurrence of the predefined image exists.

Automatic feedback. The method of the present invention may provide an optional output in the form of highlighted occurrence of the predefined image. A user may then review these highlighted occurrences in order to correct any errors. The present method may then use this corrected information as an input in steps 3-5. To further explain, the present method may provide highlighted occurrences of the predefined image in an image, images or video upon conclusion of performing the present method at least once, but preferably multiple times. The user may then adjust these highlighted occurrences by altering their shape and/or location to better map actual occurrences of the predefined image. This updated data may then be used by the present method when the method is performed again.

Step 3—Predefined Image Identification

Step 3 of some methods of the present invention will now be described. Typically the wearable device provides video data recorded by an outward facing image sensor. This video data comprises a series of images or frames. According to embodiments of the present invention, these individual images and frames are analyzed to locate each occurrence of a predefined image or at least a portion of this predefined image. The predefined image having been provided previously. The process of analyzing an image to determine a similarity between that image and another images is a well-known process in the field of computer vision. Typically it is performed by matching features from the two images to find correspondences.

It is intended that embodiments of the present invention function with any method of matching a predefined image to an image or video frame.

Step 4—Gaze Direction Mapping

The wearable device captures information related to the gaze direction of the wearer. This gaze direction information may be in the form of individual x,y coordinates representing gaze directions and it is stored for each image or frame in the video data. The gaze direction may also be in the form of three dimensional x,y,z coordinates, using the eye location. This form of gaze direction information is advantageous when used with three dimensional models as discussed farther in this document. Once an occurrence of the predefined image has been found in step 3, gaze directions which overlap the location of the predefined image are extracted.

Step 5—Confidence Value Determination

For each gaze direction found in step 4, it is advantageous to determine a value representing the likelihood that the user actually gazed at the object that is the subject of the predefined image. This is referred to as a confidence value.

A confidence value is strictly related to the state of a mapped gaze point, it does not reflect the quality of eye tracking information obtained from an eye tracker. However a low confidence value may provide information regarding what has caused the low confidence. For example the confidence value may indicate areas with occluding objects, intervals with high motion blur created by user movements, or perhaps that the shelf that is being viewed in a shopping store has changed a lot compared to the predefined image because several packages have been removed or added.

Confidence values may be computed in many ways. For example, they may be computed by comparing similarity between one or more local areas in the predefined image and one or more local areas in the image captured by the outward facing image sensor, or by detecting certain events that can affect confidence in the mapping. The one or more local areas may represent one or more subsets or sub-portion of an image, and any particular local area may or may not overlap with other local areas. Further methods may be known and understood by a person of skill in the art.

One example of a similarity-based method for determining a confidence value is to extract small subsets of the video image around a gaze point, and small subsets of the predefined image around the gaze point. The two subsets may then be compared to determine similarity, this may be using the same or similar method to that described in step 3, or it may be different. A value may then be assigned representing the level of similarity between the two subsets.

Another similarity-based method is to create a 3D model of the predefined image. The confidence value can then be computed by comparing the local 3D information, and measure how similar they are (for instance, a spherical object will match a planar object poorly, even though their appearance in the 2D images may be similar).

Below are two examples on how a 3D model may be built for a predefined image:

1. Find feature matches between the predefined image and the video/image from the outward facing sensor and triangulate the points by using structure-from-motion.

2. Use multiple images instead of one single predefined image. Each image shows the same scene, but from a different viewpoint. The points can then be triangulated by finding feature correspondences between the images, and compute the extrinsic camera parameters for each image.

An example of an event-based method for computing confidence values is to use the 3D information to detect changes in the environment. Say, for instance, that an object is removed from a shelf in a store. If this action is detected, embodiments of the present invention may mark the whole area with a tag such as "modified", and provide low confidence values to each gaze point that corresponds to that area.

Once a confidence value has been determined, it can be used in multiple ways. For example it may be used to filter out gaze directions with low confidence values, or to mark those gaze directions for further action such as a re-run of the mapping process or manual analysis.

Non-Static Environments

Performance of the present invention in a non-static environment such as a supermarket presents unique challenges. In such an environment, the image, images and video captured by the outward facing image sensor will change as the environment around the wearer of the device containing the image sensor changes. The present invention handles such an issue by allowing for the provision of multiple predefined images representing a single viewpoint captured at different times. In this way a model may be generated to demonstrate how the environment has changed over time. This may be used as an input into the determination of confidence values.

Further, it is possible to determine a quality or confidence measure representing the degree of change in the environment.

3 Dimensional Information

Building three dimensional worlds and mapping gaze without any prior steps has been suggested before in the following article: Susan M. Munn, Jeff B. Pelz (2008), "3D point-of-regard, position and head orientation from a portable monocular video-based eye tracker". This approach does not sufficiently address the problem of occlusion, fast motions, poor lighting conditions and motion-blur. The lack of other external sensors also places a heavy computational burden on the system.

Therefore, it has been proposed to map gaze data to a 3 dimensional (3D) model of an environment around the wearer of a wearable device. This process may require the use of a 3D camera to build a 3D map of an environment prior to a user with a wearable device entering the environment, post the user interacting with the environment a process is then used to determine correspondence between the 3D map and the contents from the outward facing camera in the wearable device. This can be seen in the following article: Lucas Paletta, Katrin Santner, Gerald Fritz (2013), "An integrated system for 3D gaze recovery and semantic analysis of human attention".

In accordance with some embodiments of the present invention, an improved and more efficient process is provided. This aspect of some embodiments provides for mounting a 3D sensor or the like to the wearable device. By mounting the 3D sensor to the wearable device, a 3D map of the user's environment may be built as the user is in the environment. A suitable 3D sensor would be readily apparent to a person of skill in the art, however some suitable examples are sensors using structured light, or time of flight sensors, or perhaps classic stereo camera imaging with or without active illumination. Through the use of a 3D sensor in real-time, it is possible to enable gaze mapping in non-static environments.

Preferably information from the 3D sensor is combined with information from the MEMS device. Information from the MEMS device provides data relating to the orientation and position of the wearable device, by combining this data with information from the 3D sensor it is possible to adjust the 3D information such that it is accurate when the user is in motion.

By way of example there exists many environments where 3D cameras using active illumination perform poorly. Such as environments with strong sunlight; or studies where many wearable eye-trackers are used at the same time. In these cases, the MEMS data can be used to fill in gaps where the 3D camera information is unreliable, incomplete or erroneous, since the sensors are unaffected by lighting conditions.

Tracking Multiple Images

According to one embodiment of the present invention, there is provided a system which enables a user to input many pre-defined images concurrently. During the process, the system seeks relationships between the images (for instance: the system may locate 3 images that occur together, as they are part of the same shelf for example). This may be done by mapping each image onto the 3D world and checking for proximity, or it may be achieved in other ways as would be readily understood by a person of skill in the art.

This system provides efficiencies as many predefined images are analyzed at once, as opposed to executing a separate process for each image individually.

In a further improvement, it is advantageous to allow a user to input information regarding a relationship between predefined images prior to commencement of the mapping process. For example, some predefined images may be grouped as belonging to a specific shelf or environment. Their topological relationship may also be provided (for example "image 1 is located to the left of image 3," etc.).

Human Behavior Analysis

The above method may be used to analyze human behavior in an environment. For example where at least one person is wearing a wearable device in accordance with embodiments of the present invention, the information captured by the scene camera may be combined with the position information and gaze information to map the environment around a user. It is possible therefore to build a 3D map of the environment around the user, the path the user has traveled in that environment and the attributes of the user's travel in that environment. The attributes could include location, gaze direction, speed of travel, direction of travel, vertical distance from the floor, etc. By way of example only, one such scenario in which this may be useful is in the case of a supermarket or other such large store. Traditionally to map user's paths around the supermarket, a floor map of the store must be known and then data must be gathered regarding user's within the store. This may be positional data collected by a position device which measures the location, speed, etc. of a user.

Embodiments of the present invention would therefore provide immediate improvements, users may be placed within the store wearing a wearable device in accordance with such embodiments. While wearing these devices, the devices may create a map of the environment around each user. By combining this map with gaze information and position information of the user, many embodiments allow for construction of the store map (environment) in combination with user's gaze directions, position information, speed, direction and the like. Therefore it is possible to provide a visualization of users within a store environment and represent not only their position and paths within the store, but also their speed of movement and the particular areas within the store which drew the user's gaze.

As a further advantage to this embodiment it is possible to provide a viewing angle for each mapped gaze direction, indicating the angle from which the user viewed the mapped gaze point. Gaze direction being the gaze vector from the standpoint of the user, while viewing angle is the vector form the gaze point on the target to the user. In order to compute the viewing angle, position information must be used.

This aspect of some embodiments allows the creation of heat maps representing a user's path or areas of activity in an environment, provided you have determined both position and angle information related to a user's gaze. The heat map is a visual representation of an environment with highlighted regions showing areas which received the most attention from users. This visual representation may be adjusted based on viewing angle or any other attribute of a user. For example multiple user's gaze information and attributes within the environment (as previously described) may be combined to provide for a visual representation showing which areas in the environment received the most attention. This highlighting may take the form of a traditional heat map where, for example, a color akin to red, orange and the like show areas of heavy attention whereas colors akin to blue, green and the like show areas of low attention. However any form of visual representation may be used such as shapes, logos, images, etc.

Occluded Items

When analyzing captured images from the scene camera—for example during step 4 of some embodiments, so as to provide a confidence value as described in step 5—it is possible to combine gaze information as provided by the gaze detection system. If there are occlusions (moving or non-moving objects occluding the view) in the images captured by the scene camera, problems are presented. Some embodiments account for these problems in two fashions, firstly through the provision of a confidence value as provided in step 5, an occluded object will receive a low confidence value if mapped onto the predefined image (alternatively it will be defined as not mapped to the predefined image and in this case, most likely, with a high confidence value), secondly through the use of MEMS data when building a 3D map of the environment. For example the creation of a map of a 3D environment will be difficult since any algorithms used must accurately distinguish between the static environment and the occluded objects, and/or any mapped gaze direction will be invalid as the user is looking at the occluding object instead of the environment that is represented in the predefined image. Therefore in order to accommodate and solve these problems, according to one aspect of some embodiments it is possible to utilize information from the MEMS sensor.

In a first instance, to solve the problem that algorithms used for building a map of a 3D environment must distinguish between the static environment and the occluded objects, it is proposed to filter away moving objects by searching the image for areas that behave in ways inconsistent with the ego-motion of the camera. One example of a suitable filter is as follows:

1. Determine MEMS data as a first input.
2. Compute the motion of all feature points in the image.
3. Compare with the expected motion as provided by the MEMS sensors.
4. Mark all feature points that do not follow the expected motion as outliers.
5. Use the inliers to determine the true motion of the camera and generate (triangulate) the 3D world.

Further, by providing positioning information on the user of a wearable device it is possible to combine previously obtained data (such as a previous visit by a user to a specific place in an environment) with the newly obtained scene camera data, to process and remove occlusions.

To solve the problem of invalid gaze directions as a user is gazing at an occlusion, rather than the subject of the predefined image, it is proposed to assign a low confidence value to the mapped gaze direction, such that the mapped gaze direction will be filtered out or disregarded. Alternatively the gaze day may not me mapped onto the predefined image in which case it is likely to have a high confidence value.

Transitioning Between Scenes

When analyzing sequential scenes captured by the scene camera, in some circumstances there may be distortion between scenes, this may be due to shaking or other movement of the wearable device. In such a situation, it is possible to use the position information derived from information provided by the MEMS device—such as location, orientation, rotation, etc. to compensate for this movement. For example, if a first scene image is captured by the scene camera and gaze information is applied to that scene, the next scene captured may be rotated slightly due to the wearable device moving on a user's head. The MEMS information for the point in time of the capture of each scene can be used to determine the change in position and orientation of the wearable device at the time of capture of each scene, if there is a discrepancy between the two, the scene information may be adjusted accordingly.

In order to enhance understanding of this aspect of certain embodiments, consider the following example: A user gazes at a shelf in a store, this shelf corresponds to a predefined image. Following this gaze a user may turn his or her head and gaze in another direction for a couple of seconds, before returning their gaze to the shelf. Through the use of MEMS data, these movements may be reconstructed using information obtained by the outward facing image sensor given a known starting point, and it is possible to obtain information regarding the expected location of the image from the outward facing image sensor in the latter portion of the video/series of images from the outward facing image sensor. This approach provides many benefits:

1. The time to search the video/series of images from the outward facing image sensor is reduced, since through the use of MEMS data it is possible to approximate where in the video/series of images from the outward facing image sensor to look for the predefined image.
2. Robustness against motion blur is provided. Consider a long sequence of fast head-motions. These will be very difficult to track using only visual information from the outward facing image sensor, however through the use of MEMS information it is possible to approximate motion between each stable scene/image from the outward facing image sensor. This will make the image search, the gaze mapping and the 3D localization of the user a lot easier.

There are two key components to this aspect:

1. MEMS data provides fast and robust structure-from-motion, as explained above.
2. It is further possible to refine the MEMS data by sensor fusion with the motion obtained from the outward facing image sensor. Through this, it is possible to compensate for drift and other inaccuracies in the MEMS sensor. After this has been done, it is possible to output the refined motion data.

Gaze Analysis in a 3D Environment

When analyzing gaze information, it is beneficial to consider knowledge of a 3D environment. For example, it is possible to create 3D fixation filters. By way of example, this is useful in the following manner: A person is walking around a table, constantly fixating his gaze on a certain 3D object (for example a coffee-cup). Through the use of knowledge of the 3D environment, it is possible to confidently determine that the user was looking at the same object, although the position of the user and the viewing angle was constantly changing.

This knowledge of the 3D environment also enables accurate mapping of gaze information onto complex structures that are difficult to capture in a 2-dimensional image, such as a sculpture.

It is further possible to use a 3D model as input (or multiple images of the same object taken from different view-points), instead of a predefined image.

The filter for detecting moving objects (as described previously) may also be used to track specific moving objects, such as a soccer ball. To achieve this, first knowledge of a 3D environment of all static parts of the world is obtained (as described previously); then identification and localization of all moving parts are compared to the knowledge of the 3D environment and finally gaze information is mapped to the knowledge of the 3D environment. For example this information may be used to determine when a shopper lifts an item of a shelf before looking at it and returning it, by using the filter it is possible for the present invention to mark such an occurrence.

Area of Interest

According to another aspect of some embodiments, it is possible to identify an area of interest (AOI) in an image provided by an outward facing image sensor. This AOI may be used in multiple manners. For example it is possible to note the occurrence of an AOI in any video/series of images provided by the outward facing image sensor. It is possible therefore to analyze a video captured by the outward facing image sensor, map gaze information to the video as described previously and then output a metric stating for which percentage of the video length an AOI was visible to a user (visible being defined as present in an image provided by the outward facing image sensor), and which percentage of the video the user gazed at the AOI. By knowing when an AOI is present in a frame of the video, it is also possible to analyze the gaze information to determine the time taken from when the AOI became visible to a user to when the user first gazed at the AOI.

Further by using the motion information from a wearable device according to certain embodiments, it is possible to determine when a user is approaching an area-of-interest (e.g. a person walking towards a certain commercial poster, or a shelf in a store). This can be achieved using the motion information of the user. It can also be achieved by simply finding the AOI in the image and computing it's relative size in the video image. As the user approaches the snapshot, it will occupy a larger and larger space in the recording.

Once an AOI has been accurately found in the video image, it is possible to draw the boundaries of the AOI as the video is recorded. Therefore during playback of the video, it will be easier for a human to see the AOI. It is also possible to overlay computed heat-maps in the live-video. To do this, image points in the predefined image must be transformed to the domain of the video image. This is the inverse transformation than that performed when mapping gaze direction in step 4 as discussed herein. It can also be achieved in other ways as would be understood by a person of skill in the art.

User-Input

According to a further enhancement of some embodiments, we further propose a system where the user can provide information to the mapping system prior to execution of the algorithms. Examples of such information could be:

1. Locations of video frames where the AOI is visible and easy to find
2. Correspondence points between frames in the video and the pre-defined image (manually mapped by the user)
3. Bounding rectangle that shows the approximate location of the AOI in a video frame By allowing a user to provide such information, methods described herein may be targeted to these areas highlighted by the user, or parameters in the methods may be adjusted. This allows for more efficient mapping to be performed between a captured gaze direction and predefined images.

Combination with Manual Analysis

It is an object of some embodiments of the present invention to alleviate the time consuming process of manual analysis of images and video recorded by an outward facing image sensor of a wearable device. It is possible to use embodiments herein, in conjunction with manual analysis, in order to reduce the total time taken for analysis. In this manner it is possible to use the confidence values generated to determine which mapped gaze points or sections of the recorded video from the scene camera that require further analysis.

This aspect functions in the following manner:

1. Obtain an image, images or video from an outward facing image sensor on a wearable device.
2. Capture a gaze direction of the wearer of the wearable device, at a point in time similar to when the image, images or video in step 1 was obtained.
3. Search the image, images or video from step 1 to look for the presence of a predefined image.
4. For each occurrence found in step 3, map the gaze directions from step 2 to the predefined image.
5. Determine confidence values for each gaze direction mapped in step 4. The confidence value representing either how probable it is that the gaze direction relates to the mapped point in the predefined image such as "occluded," "poor lighting," etc. which provides an indication as to the state of the mapped gaze direction.
6. Conduct manual analysis to determine whether a gaze data point relates to the predefined image, for gaze data with a confidence value meeting a certain criteria.

Manual analysis need not be performed for every gaze direction, but rather a representative gaze direction may be selected for certain portions of captured data.

The certain criteria may be a low confidence value, a confidence value within a certain range, or a confidence value having a predefined message such as "occluded," "further input," etc.

It is further possible that automatically calculated mapped gaze directions may be adjusted manually based purely on a user's preference. For example a user may review all, or a subset of, the mapped gaze directions and decide independently which to manually adjust. The manual adjustment may be marking the mapped gaze direction as relevant, not relevant, changing the subject of the mapped gaze direction, etc.

As a further improvement it is possible to visualize confidence values as a graph plotted over time, this allows the user to easily determine which parts of the video/image from the outward facing image sensor requires further manual work, and also to receive an overall view of the quality of the mapping.

Gaze Interaction

According to some embodiments there is provided a system and method for mapping gaze points from a wearable eye-tracker to one or more predefined images. The predefined image may further be captured by the outward facing image sensor. This mapping allows for interaction between a user and the environment. For example, when a user gazes at a painting in a museum, embodiments may map the gaze information to the painting and using the systems and methods described herein identify that the user is gazing at a particular painting. This information may then be communicated to an external (or internal) system which may read out-loud from a speaker (or headset) information about the painting. It is further possible to create interaction tools, where a user may "click" a button that is simply painted on a wall.

As a further example, data from the outward facing image sensors of multiple people moving through an area may be used to create a map. The map combines the data such that it is possible to select items in the map, for example shelving in a store. The predefined image may then be created by stitching data from multiple outward facing image sensors.

Partially Dynamic Predefined Images

Figure 6:
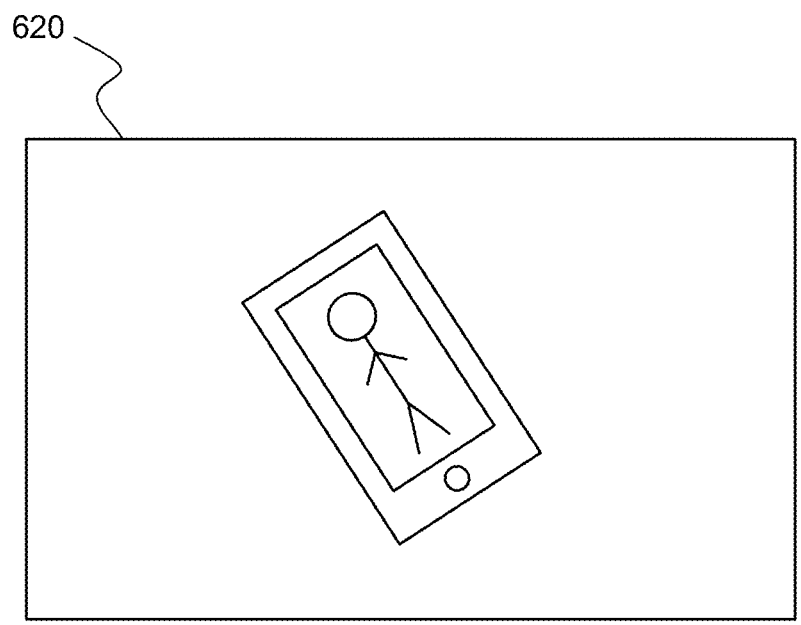
FIG. 6 is a schematic view of a scene camera image, a predefined image having a dynamic area, and additional content displayed in the dynamic area at a particular point in time.
Figure 6:
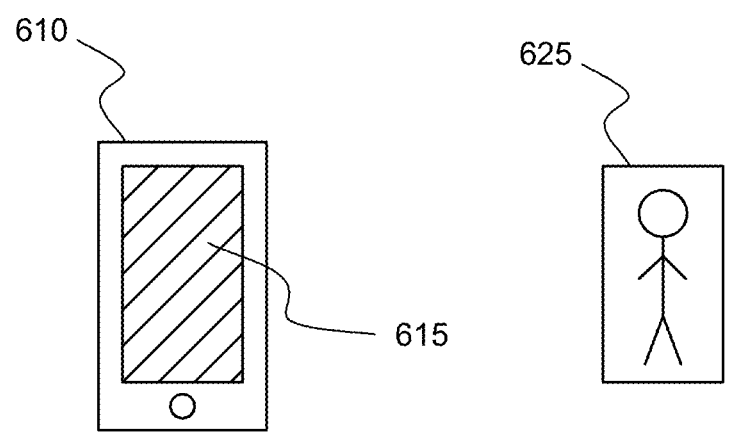

It may be further possible to utilize partially dynamic predefined images in some embodiments of the invention, where a predefined image is provided with dynamic areas of the image marked, denoted, or otherwise defined, perhaps via metadata or other data associated with the predefined image. In the example shown in FIG. 6, the predefined image 610 may be of a mobile phone having a dynamic area 615 defined with respect thereto (shown in hatch lines in FIG. 6). Dynamic area 615 of predefined image 610 may vary over time, and therefore when predefined image 615 is compared to an image 620 captured by an outward facing scene camera, dynamic area 615 may be excluded from image comparison. The above described method would allow for correct identification of predefined image 610 within image 620, even though the contents of dynamic area 615 at the time image 620 was captured may not have been provided with respect to predefined image 615 (because the content in dynamic area is unknown and/or changing).

The predefined image without inclusion of the dynamic area may be referred to herein as the "remaining portion" of the predefined image. The remaining portion of the predefined image may be static, thus not changing with respect to time. In some embodiments, such a remaining portion of a predefined image may be the frame or enclosure of a device having a dynamic display. For example, a cell phone, a tablet computer, or a television. Therefore, the remaining portion of the predefined image may include the shape, size, or any other relevant characteristic of the item in the predefined image. While in some embodiments the remaining portion of a predefined image may completely surround the dynamic area, in other embodiments the remaining portion of the predefined image may not surround the dynamic area.

Also, confidence value computations may be different when a gaze direction is close to a dynamic area. It may be important to not directly compare the contents within the dynamic area with the contents of the predefined image since the dynamic area may change at any time. Instead, the confidence value may be computed based on the areas surrounding the dynamic area and/or any other non-dynamic areas of the predefined image. Other methods of calculating confidence values are also possible.

If the contents of the dynamic area are fully known, such as when a user is looking at a computer screen where that the computer screen's contents are known at times synchronized with the times images are received from the scene camera, the predefined image can be updated prior to comparison to each frame so that it incorporates the known content of the dynamic area at the corresponding time of the frame of the scene image. In these cases, mapping of the user's gaze to the scene camera video, may be accomplished via the following steps.

First, information about the contents of dynamic area 615 is accessed, related to the current time of the image 620 being analyzed from the scene camera video. The additional information may refer to metadata, information, and/or content that is related to the dynamic area. For example, the additional information can be additional content 625 of a frame displayed at dynamic area 615 at the particular point in time in which the scene camera image 620 will be compared to predefined image 610.

Second, by using predefined image 610, the known dynamic area 615 in predefined image 610, and the additional content 625 for the time associated with the scene image 620, an area in scene image 620 may be identified where the content of the area represents a combination of predefined image 610 and the additional content 625. This combination may be referred to as a second predefined image.

In some situations, due to the weak dynamic range of the outward facing image sensor, lack of auto imaging parameters adjustment, or other factors, the scene image 620 may be overexposed, have an incorrect white balance, and/or other visual defects that cause the search and comparison algorithm to not be able to locate the second predefined image which incorporates the additional content 625. For example, if the additional content 625 represents a person, but the scene video is overexposed, the person may not be locatable in the scene video. In such case, perhaps upon determining the scene image 620 has one or more of the above identified defects, the search and comparison algorithm may only use predefined image 610 without additional content 625.

Third, the process may map the gaze direction of the user from the scene video onto at least a portion or particular location of the second predefined image, including either the static portions of the predefined image 610, and/or the additional content 625.

Fourth, the process may compute a confidence value based on some or all available information. The available information includes at least one or more of the following: 3d information about the real-world viewed in the scene image 620 (pre-computed or computed in real-time), pixel information extracted from local areas of the scene image 620 (or subsets), levelness of motion-blur in the scene image 620 at the current time point, and/or amount of occlusion of the first or second predefined image (i.e., if something is occluding the first or second predefined image 610 in the scene image 620, we may lower the confidence value as opposed to a case that there is no occlusion). However, the available information is not limited the aforementioned examples. A person of skilled in the art may be use other information to determine confidence values.

It should be noted that partial information about the dynamic area can also be used in order to enhance the understanding of the predefined image. For instance, the contents of the dynamic area may be completely arbitrary, except for a certain advertisement or other content may occur at any time. If this is the case, specific algorithms may be created that search for the specific ad inside the dynamic area, once the dynamic area has been located in the image. In some embodiments the size and/or shape of the dynamic area 615 may allow a process to identify the predefined image 610 in a scene image 620 by determining that an area of image 620 has changed over time, and the size and/or shape of that area matches the size and/or shape of dynamic area 615 in predefined image 610.

General Information Applicable to Any Embodiments of the Present Invention

Although the present invention has been described with reference to a MEMS device acting as a positional sensor, or a sensor measuring change in position and/or orientation and/or acceleration, it is possible to use other embodiments of the present invention with any form of device which provides positional information. This includes devices external to the wearable device, for example external cameras may be used to capture a location of the wearable device, these cameras may use infrared light and/or retro-reflective markers may be placed on the wearable device. Positional devices would be readily understood by a person of skill in the art.

Although embodiments of the present invention has been described with reference to a predefined image. It is intended to be understood that any information may be used in place of the predefined image. For example in place of an image, characteristics of an object or image may be used. In this way rather than providing an image of a ball, it is possible to provide characteristics of the ball ("spherical," "black," etc.).

Though embodiments of the present invention have been described with reference to an outward facing image sensor, it is also contemplated that there may be more than one outward facing image sensor. For example if two outward facing image sensors are provided, stereo data may be obtained from the two image sensors and this stereo data allows for easier calculation of 3D information as would be readily understood by a person of skill in the art.

Illustrated Example Embodiments

Figure 2:
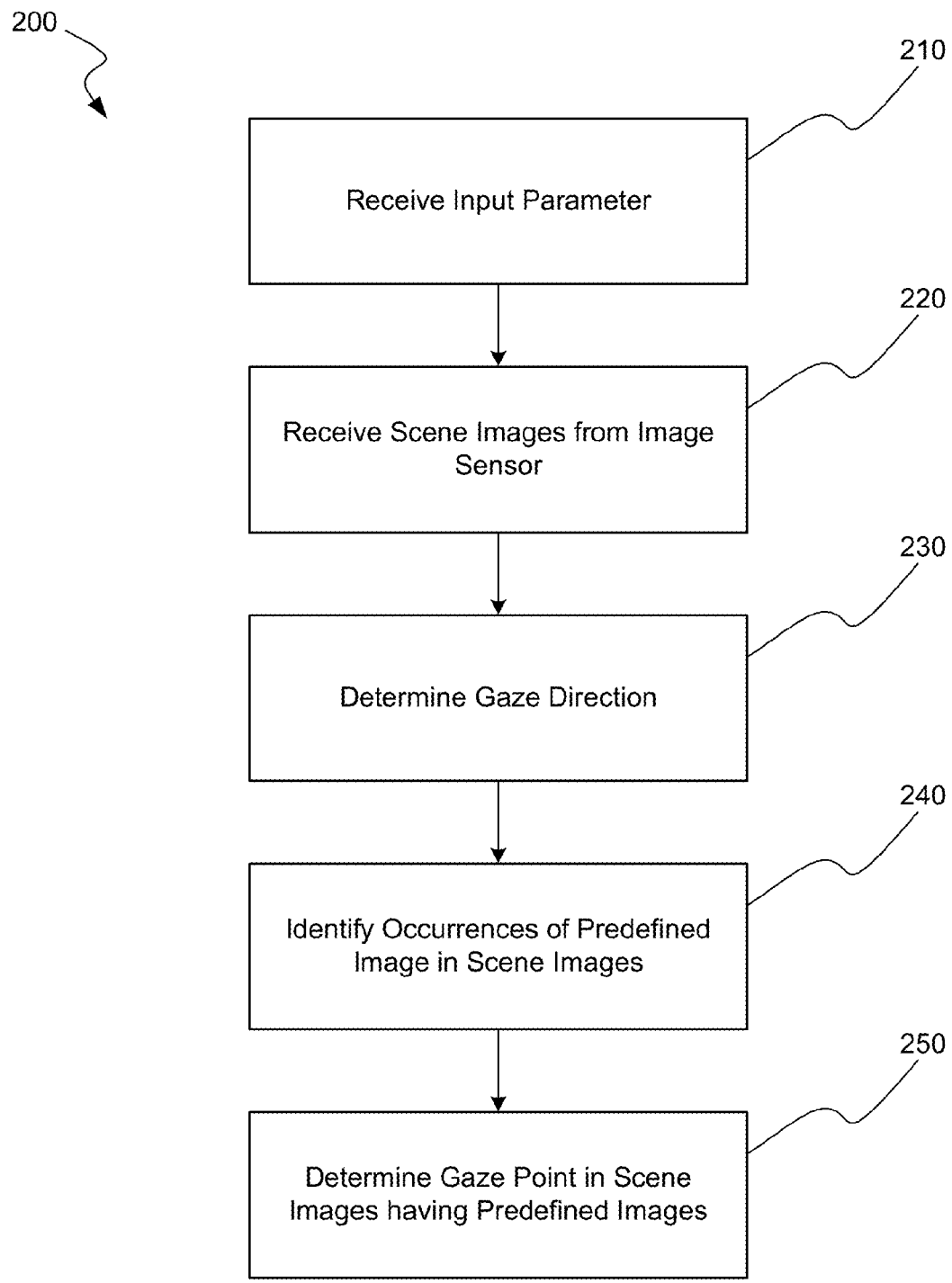
FIG. 2 is a block diagram of one method of the invention for determining a gaze point relative to a predefined image found in a scene image.

FIG. 2 shows a block diagram of one method 200 of the invention for determining a correspondence between a gaze direction and an environment around a wearable device, where the wearable device includes an eye tracking device and an outward facing image sensor.

At block 210, an input parameter may be received which will allow method 200 to determine what predefined image(s) shall cause a gaze point to be mapped in a given scene image. As discussed above, the input parameter may be received from a user, but may also be automatically determined in some embodiments.

At block 220, scene images or video are received from the image sensor. At block 230, a gaze direction of the user of the wearable device is determined corresponding in time to the images or video received.

At block 240, based on the input parameter, the images or video are analyzed to determine whether and when they include the predefined image(s) (or some portion thereof). At block 250, for each particular image within the images or video that includes the predefine image, a gaze point on such images or video is determined based on the gaze direction. The relative positions of the predefined image and the gaze point can then be analyzed by other processes to draw correlations and/or conclusions about the user's reaction to the object represented by the predefined image.

Figure 3:
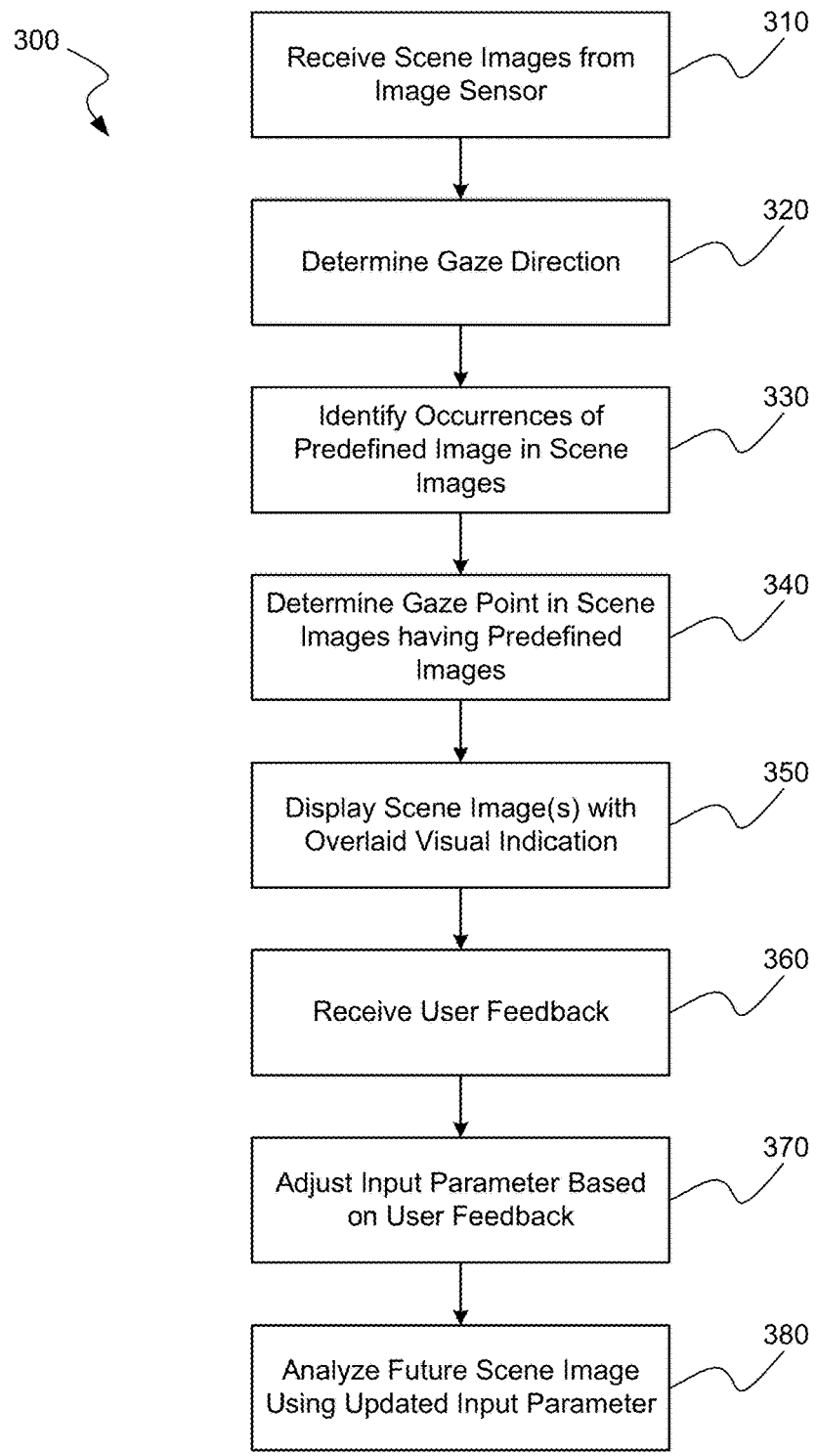
FIG. 3 is a block diagram of another method of the invention for, based on user feedback, updating an input parameter used to identify predefined images in a scene image.

FIG. 3 shows a block diagram of another method 300 of the invention for determining a correspondence between a gaze direction and an environment around a wearable device, where the wearable device includes an eye tracking device and an outward facing image sensor.

At block 310, scene images or video are received from the image sensor. At block 320, a gaze direction of the user of the wearable device is determined corresponding in time to the images or video received.

At block 330, based on an input parameter, the images or video are analyzed to determine whether and when they include the predefined image(s) (or some portion thereof). As discussed above, the input parameter may be received from a user, but may also be automatically determined in some embodiments.

At block 340, for each particular image within the images or video that includes the predefine image, a gaze point on such images or video is determined based on the gaze direction.

At block 350, the scene image is displayed with an overlaid visual indication, where the overlaid visual indication corresponds to the predefined image (or at least some portion thereof). At block 360, user feedback regarding adjustment of the overlaid visual indication may be received. Merely by way of example, the user may manipulate the size and shape of a polygon overlaying the predefined image.

At block 370, the input parameter originally used to determine the presence of the predefined image is adjusted based at least in part on the user feedback. At block 380, a future scene image is analyzed based on the adjusted input parameter to determine if the predefined image is present.

Figure 4:
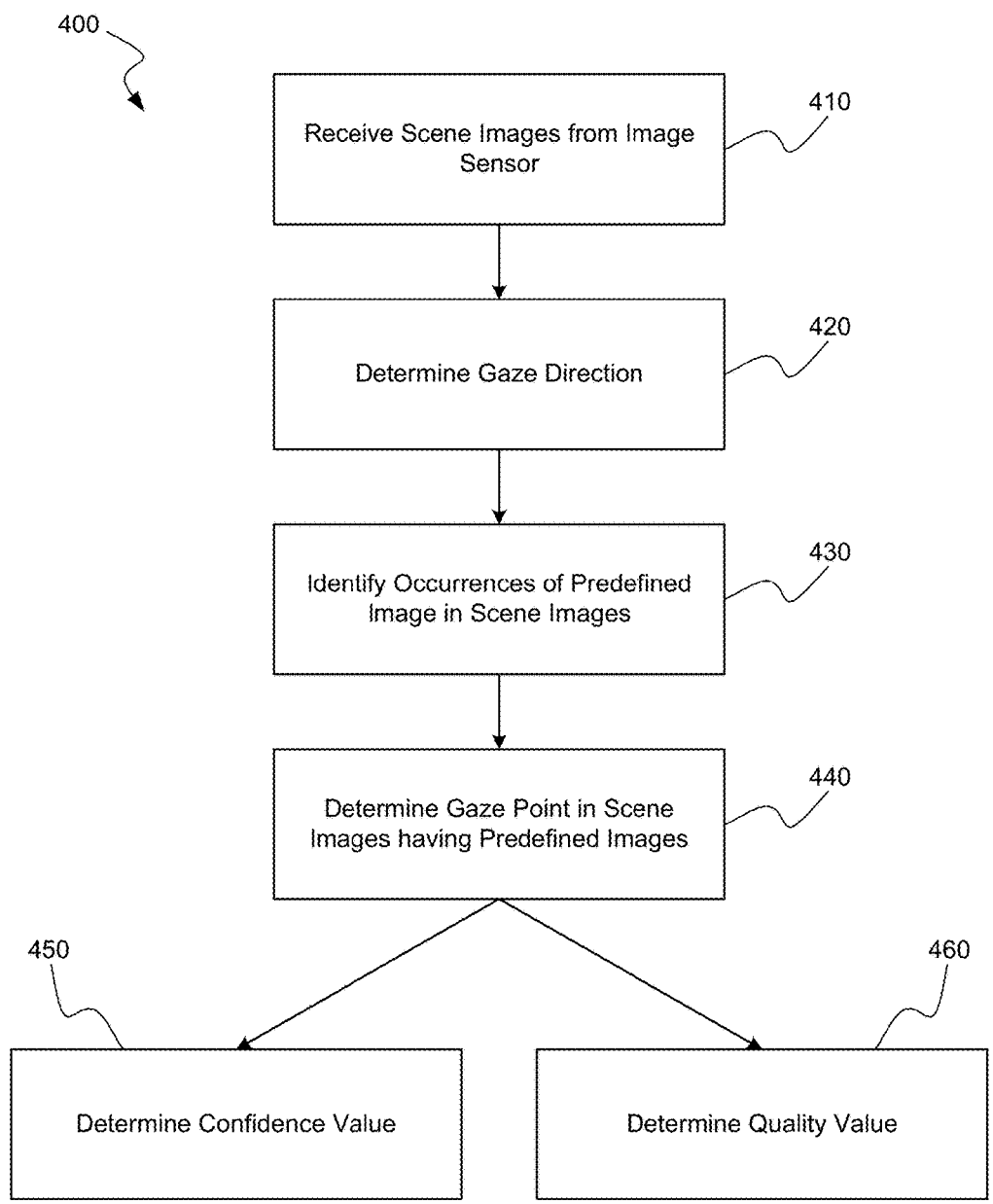
FIG. 4 is a block diagram of another method of the invention for determining confidence and quality values related to gaze points which correspond to occurrences of a predefined image.

FIG. 4 shows a block diagram of another method 400 of the invention for determining a correspondence between a gaze direction and an environment around a wearable device, where the wearable device comprises an eye tracking device and an outward facing image sensor.

At block 410, scene images or video are received from the image sensor. At block 420, a gaze direction of the user of the wearable device is determined corresponding in time to the images or video received.

At block 430, based on an input parameter, the images or video are analyzed to determine whether and when they include the predefined image(s) (or some portion thereof). As discussed above, the input parameter may be received from a user, but may also be automatically determined in some embodiments.

At block 440, for each particular image within the images or video that includes the predefine image, a gaze point on such images or video is determined based on the gaze direction.

At block 450, a confidence value may be determined which is a representation of how probable it is that the at least one gaze point relates to the mapped point in the predefined image. Alternatively, or additionally, at block 460, a quality value may be determined which is a representation of a degree of error in the determined at least one gaze point on the particular scene image.

Figure 5:
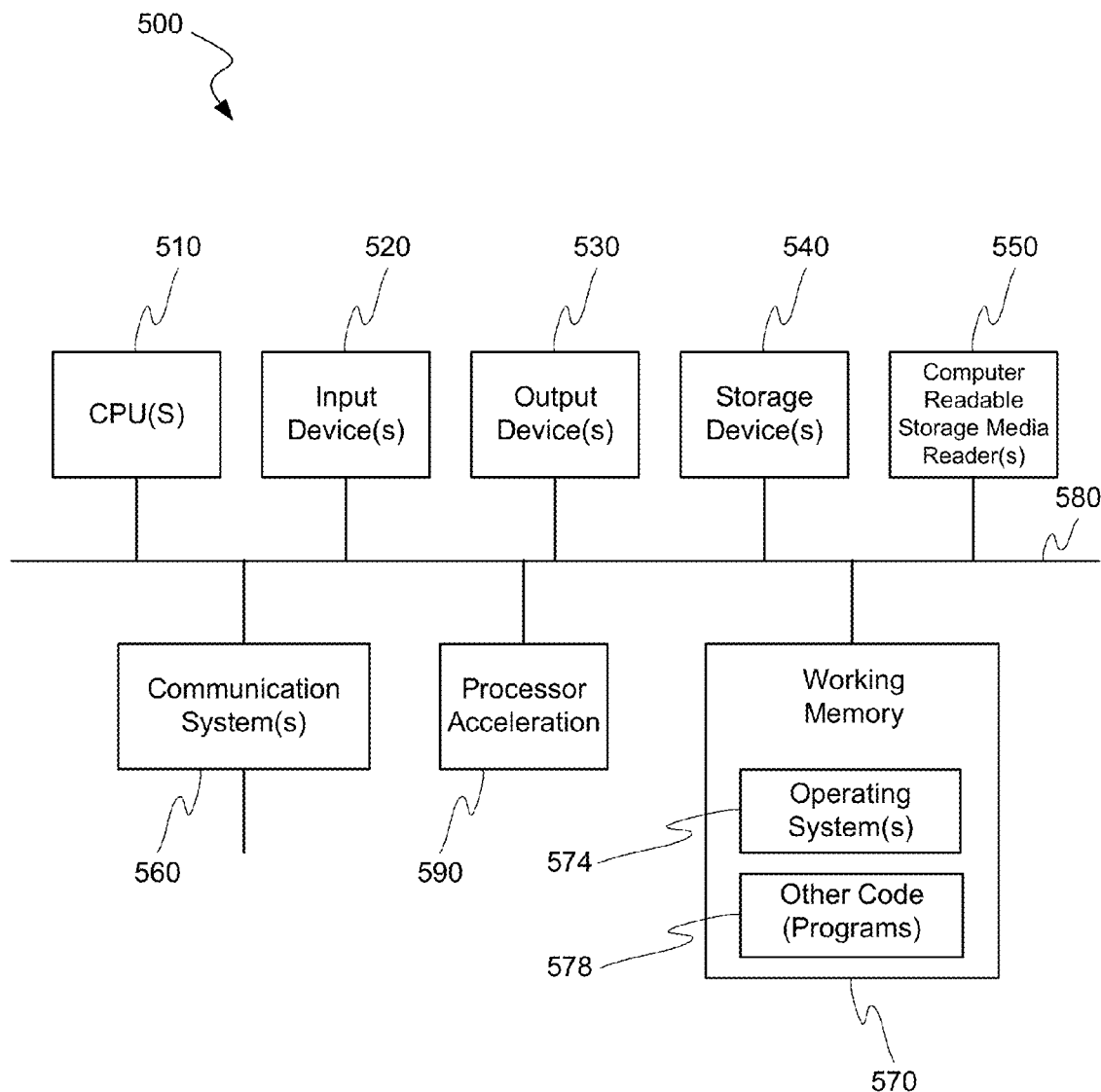
FIG. 5 is a block diagram of an exemplary computer system capable of being used in at least some portion of the apparatuses or systems of the present invention, or implementing at least some portion of the methods of the present invention.

Example Hardware Capable of Implementing One or More Embodiments of the Invention FIG. 5 is a block diagram illustrating an exemplary computer system 500 in which embodiments of the present invention may be implemented. This example illustrates a computer system 500 such as may be used, in whole, in part, or with various modifications, to provide the functions of the components of the invention such as those discussed above. For example, various functions of the wearable eye tracking device may be controlled by the computer system 500.

The computer system 500 is shown comprising hardware elements that may be electrically coupled via a bus 580. The hardware elements may include one or more central processing units 510, one or more input devices 520 (e.g., a mouse, a keyboard, eye tracking device, etc.), and one or more output devices 530 (e.g., a display device, a printer, etc.). The computer system 500 may also include one or more storage device 540. By way of example, storage device(s) 540 may be disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 550, a communications system 560 (e.g., a modem, a network card (wireless or wired), an infra-red communication device, Bluetooth™ device, cellular communication device, etc.), and working memory 8570, which may include RAM and ROM devices as described above. In some embodiments, the computer system 500 may also include a processing acceleration unit 590, which can include a digital signal processor, a special-purpose processor and/or the like.

The computer-readable storage media reader 550 can further be connected to a computer-readable storage medium, together (and, optionally, in combination with storage device(s) 540) comprehensively representing remote, local, fixed, and/or removable storage devices plus storage media for temporarily and/or more permanently containing computer-readable information. The communications system 560 may permit data to be exchanged with a network, system, computer and/or other component described above.

The computer system 500 may also comprise software elements, shown as being currently located within a working memory 570, including an operating system 574 and/or other code 578. It should be appreciated that alternate embodiments of a computer system 500 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 500 may include code 578 for implementing any or all of the function of the various elements of the architecture as described herein. For example, software, stored on and/or executed by a computer system such as system 500, can provide the functions of the wearable eye tracking device, and/or other components of the invention such as those discussed above. Methods implementable by software on some of these components have been discussed above in more detail.

User Review of Gaze Mapped Images In another embodiment, a method for reviewing a correspondence between a gaze position in the scene image and the predefined image is provided.

In some embodiments, after the gaze mapping analysis, software may allow a user to review the gaze position correspondence side-by-side between the scene image frame and the predefined image. However, since the field of views change frequently during typical scene image recording, the user's gaze positions may vary widely within the field of view. During the review process of the gaze correspondence between the scene image and the predefined image, the review of each gaze correspondence is displayed in sequence in response to either user's manual operation or the software automatically indicating/displaying the next/previous gaze correspondence. Thus, you will see two images, displayed side by side, changing their field of views frequently.

However, this may present some issues. First, the change of the field of view between each comparison set may be disconcerting to the user. Second, because the gaze mapping results may not be completely correct (hence the user review), the reviewer cannot assure the gaze position in a specific scene image frame is correctly mapped to the correct region/position in the predefined image without a significant cognitive effort because of the changing of the field of view. Therefore, when reviewing, it may be easy to overlook some incorrect gaze correspondence and miss conducting necessary manual corrections.

Thus, some embodiments of the invention may provide a process with features to mitigate the burden of the above described review process, allowing the user to more easily and expediently correct incorrect mapped gaze correspondences.

After the gaze correspondence between a plurality of scene image frames and the predefined image has been done via the software automation, a user may conduct a review of the gaze correspondence, with the purpose of allowing the user to manually correct any incorrect mappings (i.e., incorrect correspondences between predefined images and images within scene camera images and/or locations of the gaze point as mapped to the scene image). A process may be provided to facilitate this process as described below.

First, the mapped gaze positions from the scene video which are in proximity to each other on a predefined image found therein are grouped in the predefined image into a plurality of groups or clusters. Each group/cluster includes at least one gaze position, and each group/cluster is in a different region/location on the predefined image.

Figure 7:
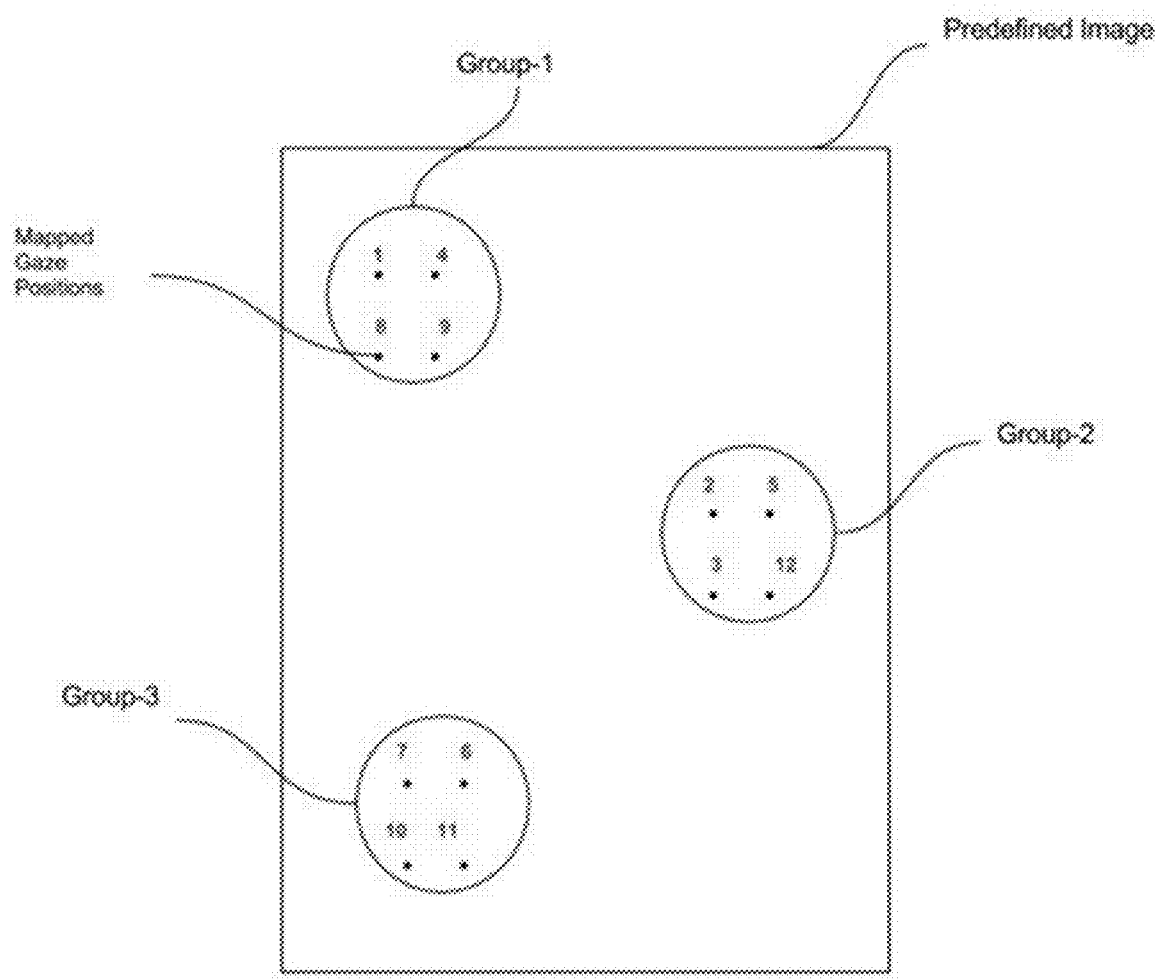
FIG. 7 is an example of grouping/clustering of mapped gaze points on a predefined image with respect to one embodiment of the invention.

Second, each group/cluster may be assigned an identifier, and the sequence number of each gaze position (order in which the gaze positions occurred) will also be specified within the group/cluster. The identifiers and sequence numbers may be recorded for future usage. FIG. 7 shows an example of such an arrangement.

Third, the user may start the gaze correspondence review process, which causes scene image frames and the predefined image to be presented side by side. The gaze position on the scene image frame and the estimated correlated position of the same point in the predefined image may also be denoted on each of the scene image and the predefined image. Each correlated set of scene image and predefined image may be presented in sequential order either automatically or in response to a user command. The scene image frame and/or the predefined image may be cropped around the mapped gaze point depending on the embodiment.

Fourth, the correlated sets are presented in order of the group identifiers assigned in the second step above, but within such groups by order of the sequence number within each group. See FIG. 7 for reference. In this manner, similarly located mapped gaze points to a particular location within the predefined image may be reviewed together, increasing user review speed. In some embodiments, vertical or horizontal alignment of the mapped gaze points in the scene image and the predefined image may be provided during display. Also, vertical or horizontal distances between such displayed points may be minimized to allow for quicker review.

In these or other embodiments, during the review of the gaze correspondence another feature may be provided. This feature may be described with reference to the following sequence.

First, the predefined image may be displayed, together with a notation which defines one particular area-of-interest in the predefined image. The region may be highlighted in the predefined image. Such region may be specified by the user upon user's input of a certain area in the predefined image.

Second, a plurality of mapped gaze positions within the predefined image may be visible depending upon a user's preference. If they are visible, they may be marked with different colors in order to differentiate them from each other. In such case, the corresponding gaze point in the scene image (described below) should be given the same color as their counterpart in the predefined image. It is also possible to use other identifiers than colors, such as shape, size or numeric numbers, or any combination of identifiers. Other identifiers may also be used.

Third, a plurality of cropped scene image frames are displayed together in a matrix form to the left side of the predefined image. In other embodiments, the plurality of cropped scene image frames may be positioned and arranged in other ways. For example, they could be displayed on a another monitor that does not display the predefined image (such as a tablet computer, or any mobile device). It should also be understood that any arrangements are possible (and not only matrix formations).

Each of the cropped scene image frames includes one recorded gaze position for the frame. The frames may be presented in the matrix form in a manner which corresponds to their sequence (i.e., in order). However, the order of the frames may be shown in other ways. For instance, they could be grouped according to image similarity (many metrics exist in the computer vision literature which would be understood by a person who is skilled in the art). They could also be grouped in other ways, potentially making the reviewing process as comfortable as possible for the human user.

Upon a user's click (or other input) on a specific cropped scene image frame, the user may be able to mark the frame as "incorrectly mapped." This would mean that the gaze direction in the cropped scene image frame does not map into the current area-of-interest region in the predefined image. The incorrectly mapped frames may be put in a queue so that the user can correct them afterwards. Other ways of handling incorrect frames may also be possible. Also, the user could click on the correct position in the predefined image.

Moreover, upon the user's click (or other input) on a specific position of a scene image frame, the user may be able to input an adjustment of the gaze position in the scene image frame. Alternatively, a user may specify a scene image frame and then click on a specific position in the predefine image to correct the incorrectly recorded gaze position.

The user's correction operation during the review process will be recorded in an operation log and the log may be stored separately from the predefined image. Alternatively, the log may be stored/embedded as part of the file structure of the predefined image (after mapping all the gaze positions).

The invention has now been described in detail for the purposes of clarity and understanding. However, it will be appreciated that certain changes and modifications may be practiced within the scope of the appended claims.

What is claimed is:

1. A method for modifying an estimated gaze position of an image, the estimated gaze position indicating a correspondence between a gaze direction and an environment depicted by the image, wherein the method comprises:
   receiving a group of multiple images, each image in the group including an estimated gaze position,
   receiving an indication of an area of interest on a predefined image;
   for each image in the group, determining that the estimated gaze position is within an area of the image corresponding to the area of interest;
   selecting, from the group of multiple images, a set of one or more clustered images, wherein the estimated gaze position for each of the clustered images is located within the respective corresponding area;
   displaying each image of the set of clustered images with an indication of the estimated gaze position;
   receiving an indication of a corrected gaze position;
   based on the indication of the corrected gaze position, modifying each image of the set of clustered images to include the corrected gaze position.

2. The method of claim 1, further comprising determining an additional set of one or more clustered images, wherein:
   each estimated gaze position for a respective image in the set of clustered images corresponds to a first location in the area of interest,
   each estimated gaze position for a respective image in the additional set of clustered images corresponds to a second location in the area of interest, wherein the second location is different from the first location.

3. The method of claim 1, further comprising displaying the predefined image on a display device, wherein the indication of the area of interest is received via an input device.

4. The method of claim 1, wherein the indication of the corrected gaze position is received via a user input device.

5. The method of claim 1, further comprising cropping each image of the set of clustered images, wherein:
   displaying each image of the set of clustered images with the indication of the estimated gaze position includes displaying each cropped image with the indication of the estimated gaze position.

6. The method of claim 1, wherein displaying each image of the set of clustered images with an indication of the estimated gaze position comprises:
   displaying the set of clustered images in a matrix formation, wherein each image of the set of clustered images has a position in the matrix formation based on a priority associated with each image of the set of clustered images.

7. The method of claim 6, wherein:
   the set of clustered images is comprised of frames in a video recording, and
   the priority associated with the each image in the matrix formation is based on a capture time of a respective frame in the video recording.

8. A system for modifying an estimated gaze position of an image, the estimated gaze position indicating a correspondence between a gaze direction and an environment depicted by the image, wherein the system comprises one or more processors configured to perform operations comprising:
   receiving a group of multiple images, each image in the group including an estimated gaze position,
   receiving an indication of an area of interest on a predefined image;
   for each image in the group, determining that the estimated gaze position is within an area of the image corresponding to the area of interest;
   selecting, from the group of multiple images, a set of one or more clustered images, wherein the estimated gaze position for each of the clustered images is located within the respective corresponding area;
   displaying each image of the set of clustered images with an indication of the estimated gaze position;
   receiving an indication of a corrected gaze position;
   based on the indication of the corrected gaze position, modifying each image of the set of clustered images to include the corrected gaze position.

9. The system of claim 8, further comprising determining an additional set of one or more clustered images, wherein:
   each estimated gaze position for a respective image in the set of clustered images corresponds to a first location in the area of interest,
   each estimated gaze position for a respective image in the additional set of clustered images corresponds to a second location in the area of interest, wherein the second location is different from the first location.

10. The system of claim 8, further comprising displaying the predefined image on a display device, wherein the indication of the area of interest is received via an input device.

11. The system of claim 8, further comprising cropping each image of the set of clustered images, wherein:
   displaying each image of the set of clustered images with the indication of the estimated gaze position includes displaying each cropped image with the indication of the estimated gaze position.

12. The system of claim 8, wherein displaying each image of the set of clustered images with an indication of the estimated gaze position comprises:
   displaying the set of clustered images in a matrix formation, wherein
   each image of the set of clustered images has a position in the matrix formation based on a priority associated with each image of the set of clustered images.

13. The system of claim 12, wherein:
   the set of clustered images is comprised of frames in a video recording, and
   the priority associated with the each image in the matrix formation is based on a capture time of a respective frame in the video recording.

14. A non-transitory machine readable medium having instructions stored thereon for modifying an estimated gaze position of an image, the estimated gaze position indicating a correspondence between a gaze direction and an environment depicted by the image, wherein the instructions are executable by one or more processors for at least:

receiving a group of multiple images, each image in the group including an estimated gaze position, receiving an indication of an area of interest on a predefined image;

for each image in the group, determining that the estimated gaze position is within an area of the image corresponding to the area of interest;

selecting, from the group of multiple images, a set of one or more clustered images, wherein the estimated gaze position for each of the clustered images is located within the respective corresponding area;

displaying each image of the set of clustered images with an indication of the estimated gaze position;

receiving an indication of a corrected gaze position;

based on the indication of the corrected gaze position, modifying each image of the set of clustered images to include the corrected gaze position.

15. The non-transitory machine readable medium of claim 14, further comprising determining an additional set of one or more clustered images, wherein:

each estimated gaze position for a respective image in the set of clustered images corresponds to a first location in the area of interest, each estimated gaze position for a respective image in the additional set of clustered images corresponds to a second location in the area of interest, wherein the second location is different from the first location.

16. The non-transitory machine readable medium of claim 14, further comprising displaying the predefined image on a display device, wherein the indication of the area of interest is received via an input device.

17. The non-transitory machine readable medium of claim 14, wherein the indication of the corrected gaze position is received via a user input device.

18. The non-transitory machine readable medium of claim 14, further comprising cropping each image of the set of clustered images, wherein:

displaying each image of the set of clustered images with the indication of the estimated gaze position includes displaying each cropped image with the indication of the estimated gaze position.

19. The non-transitory machine readable medium of claim 14, wherein displaying each image of the set of clustered images with an indication of the estimated gaze position comprises:

displaying the set of clustered images in a matrix formation, wherein each image of the set of clustered images has a position in the matrix formation based on a priority associated with each image of the set of clustered images.

20. The non-transitory machine readable medium of claim 19, wherein:

the set of clustered images is comprised of frames in a video recording, and the priority associated with the each image in the matrix formation is based on a capture time of a respective frame in the video recording.

* * * * *